April 3, 1928.
J. R. HEWETT
1,664,818
PHOTOGRAPHIC EXPOSURE CALCULATOR
Filed June 2, 1922　　3 Sheets-Sheet 1
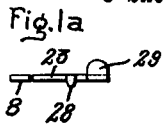
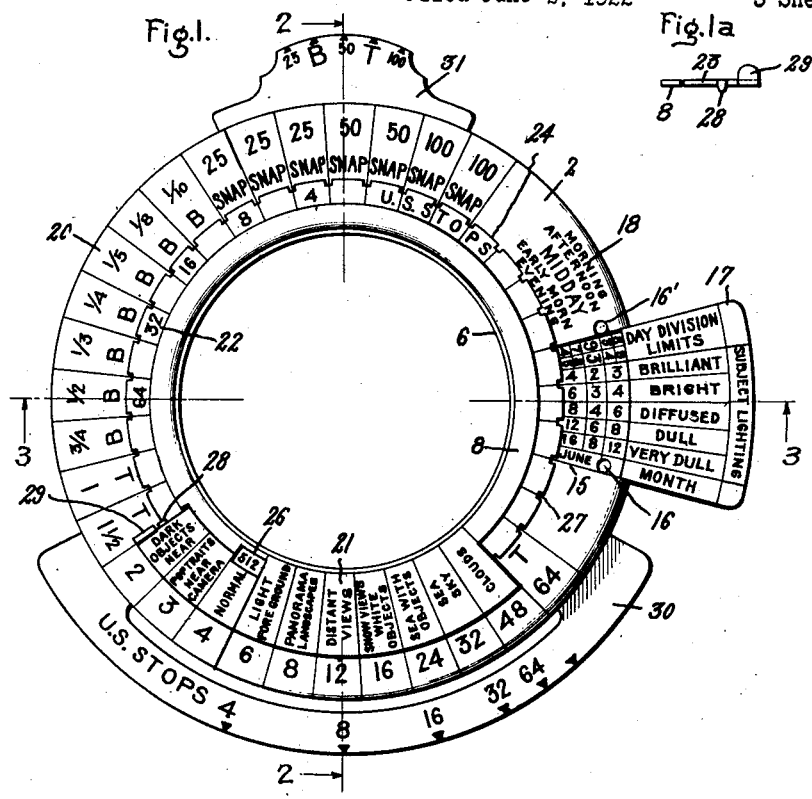
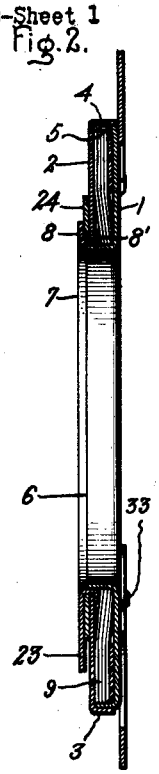
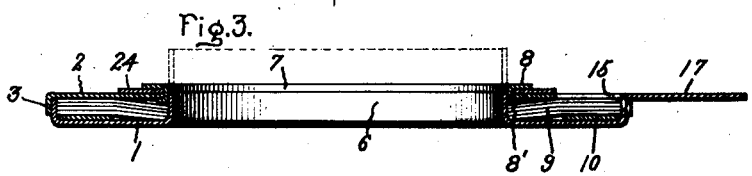
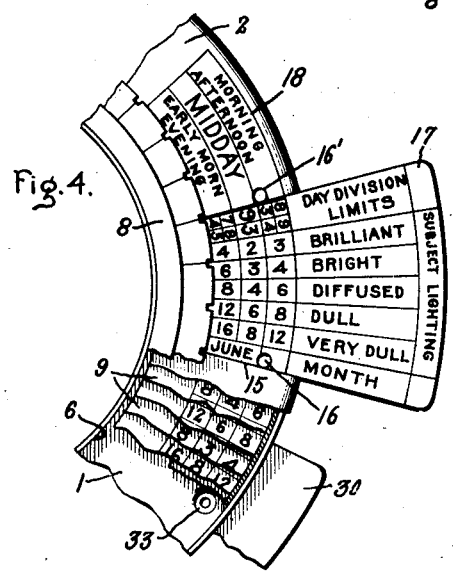
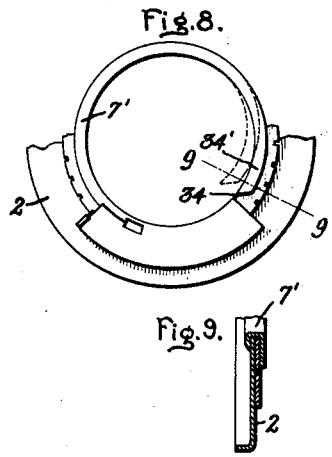
Inventor:
John R. Hewett,
by Russell A. Warner
His Attorney April 3, 1928.  
J. R. HEWETT  
PHOTOGRAPHIC EXPOSURE CALCULATOR  
Filed June 2, 1922  
1,664,818  
3 Sheets-Sheet 2
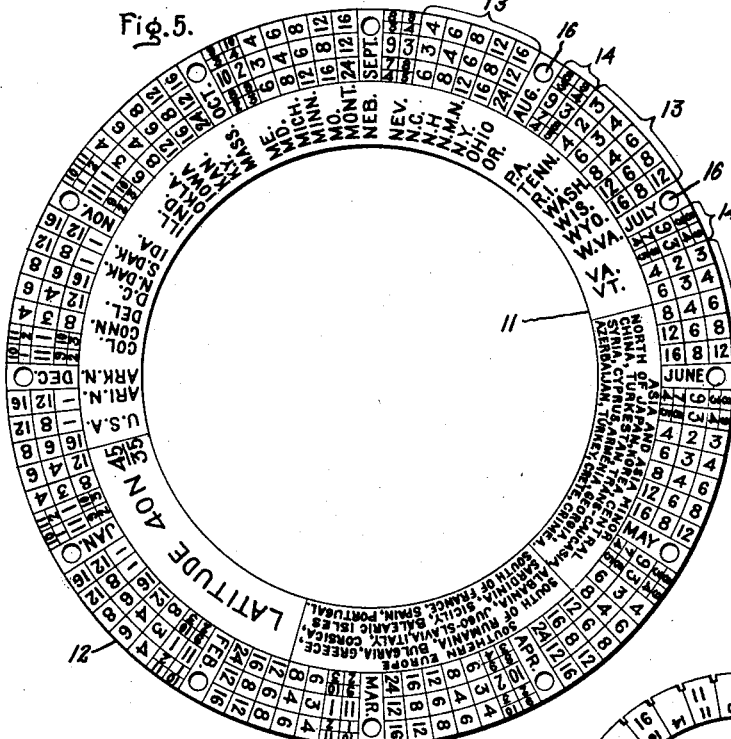
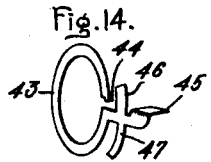
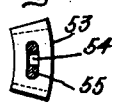
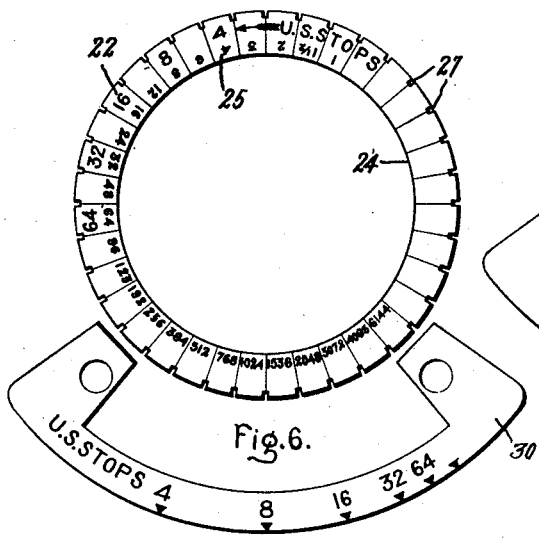
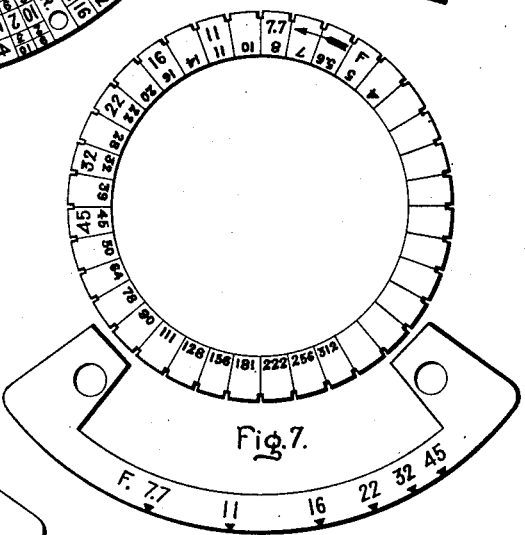
Inventor:  
John R. Hewett,  
by Russell A. Warner  
His Attorney April 3, 1928. 1,664,818
J. R. HEWETT
PHOTOGRAPHIC EXPOSURE CALCULATOR
Filed June 2, 1922 3 Sheets—Sheet 3
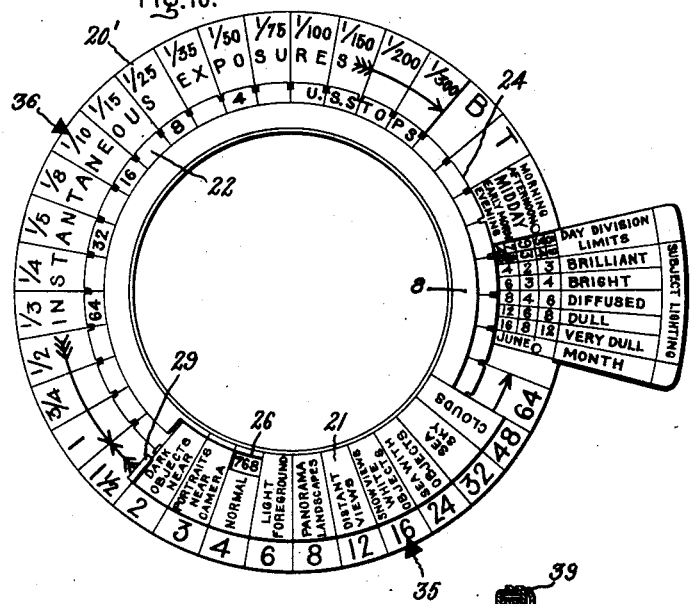
Inventor:
John. R. Hewett,
by Russell A. Warner
His Attorney

Patented Apr. 3, 1928.

1,664,818

UNITED STATES PATENT OFFICE.

JOHN R. HEWETT, OF SCHENECTADY, NEW YORK.

PHOTOGRAPHIC EXPOSURE CALCULATOR.

Application filed June 2, 1922. Serial No. 565,482.

My invention relates to photographic exposure calculators of the type wherein the light value for a given time and place, as determined from an exposure table, is correlated with the sensitiveness of the film or plate being used and with the subject being photographed in order to determine proper camera exposure adjustments.

The primary object of my invention is the provision of a simple exposure calculator which combines the correlating mechanism and all necessary exposure tables in a single instrument.

A further object is the provision of an exposure calculator so designed that it may be mounted in fixed relation to a camera preferably about the lens tube and when so mounted about the lens tube of a camera certain of its scales may, if desired, be used as the stop and timer adjusting scales of the camera.

A further object is the provision of an exposure calculator wherein only those portions of the scales and tables of the calculator susceptible of use for a given set of conditions are exposed thereby reducing to a minimum the liability of incorrectly reading the calculator.

A further object is the provision of such a calculator wherein only one adjustment is required to indicate in terms of the usual camera markings the correct camera adjustments for a given plate speed and for any given subject and light value.

A further object of my invention is the provision of an exposure calculator which may be converted into an exposure meter by substituting for its tables means for measuring the light value. Further objects and advantages of my invention will appear as the description proceeds.

In my United States Patent 1,575,338 I have described and broadly claimed certain features of the calculating mechanism described in the present application. In said patent the calculating mechanism is described in combination with means for measuring the light value by the chemical action of light on a photosensitive film. My improved calculating instrument is preferably mounted about the lens tube of the camera in fixed relation thereto and contains all of the necessary tables for determining light factors for any time and location. The light factor table for the proper time of day, month, latitude and subject lighting condition will appear in an opening in the instrument so that all it is necessary for the photographer to do is to hold his camera in one hand and make one simple adjustment of the calculator with the other hand to determine his camera exposure instructions and then without changing the position of the camera set his camera stop and exposure pointers to the determined instructions.

The features of my invention which I believe to be novel and patentable will be pointed out in the claims appended hereto. The details of construction and the manner of using my improved exposure calculating instrument will now be explained in connection with the accompanying drawings in which Fig. 1 is a front view of one form of my improved exposure calculator which is adjustable for different plate speeds; Fig. 1ᵃ shows a detail of Fig. 1; Fig. 2 is a section on line 2—2 of Fig. 1; Fig. 3 is a section on line 3—3 of Fig. 1; Fig. 4 is an enlarged view of a portion of the calculator of Fig. 1 with parts broken away to show the interior arrangement; Fig. 5 shows one side of one of the disc tables used in my improved calculator, the tables illustrated being for latitude 40 deg. N.; Figs. 6 and 7 show opposite sides of certain portions of the calculator illustrative of its adaptability for the uniform and focal systems of camera markings; Figs. 8 and 9 illustrate details of construction of the instrument which permit the ring shown in Figs. 6 and 7 to be reversed, Fig. 9 illustrating a section taken on line 9—9 of Fig. 8; Fig. 10 shows a front view of the calculator arranged to have certain of its scales serve as the stop and shutter timer adjusting scales of a camera; Fig. 11 shows a front view of a fixed plate speed calculator arranged to expose only limited portions of the calculator scales and light table; Fig. 11ᵃ shows a section taken on line 11ᵃ—11ᵃ of Fig. 11; Fig. 12 illustrates the calculator mounted about the lens tube of a camera; Fig. 13 illustrates the manner of opening the calculating instrument when it is desired to change a light table disc for another of a different latitude; Figs. 14 to 17 inclusive show extra parts which are interchangeable with parts of the calculator should it be desired to use the instrument as an exposure meter.

In the drawings like parts are designated by the same reference numerals. Referring now more in particular to Figs. 1 to 5 inclusive, the body portion of the instrument comprises a casing preferably in a form adapted to fit about the lens tube of a camera and to be secured thereto in any convenient manner so as not to interfere with the proper operation thereof. It is convenient to make the casing in an annular form comprising a rear channel section 1 and a front section 2 having an annular outer rim 3 adapted to fit about and be detachably secured to the rear section 1 in any convenient manner such as by a plurality of spaced spring lugs 4 on rim 3 fitting into corresponding recesses 5 on the outer channel portion of the rear section 1 (see Figs. 2 and 13). The inner edge of front section 2 of the casing does not extend to the inner channel wall 6 of the back section but is spaced therefrom so as to allow the insertion of a relatively movable ring 7 having marginal flanges 8 and 8' at its ends. Within the casing thus formed there is provided one or more thin discs 9 carrying tables of light factors for suitable divisions of the year and day and a spacer disc 10. One side of a complete disc 9 is shown in Fig. 5 illustrating the preferred arrangement of the light factor tables. Before proceeding further with the explanation of the calculating instrument, it will be desirable to explain what is meant by the term "light factor". For the purposes of exterior photography, the determination of natural light intensities depends primarily upon four conditions, namely; the latitude, the time of year, the time of day, and the atmospheric condition. Thus, the light intensity at the equator is greater than at 40 deg. N. latitude under similar conditions. The light intensity at 40 deg. N. latitude is greater in the summer than in the winter, at noon than it is in the morning or evening, and on a clear day than it is on a cloudy day. The relative light intensities for different latitudes and for different months, times of day and weather conditions may be and have been predetermined with a sufficient degree of accuracy to serve as a guide for determining the proper camera adjustments to be used for obtaining correct photographic exposures. These relative light intensity values may be calculated from the physical constants of the universe or obtained from actual measurement. Light values have been determined and tabulated by various authors in various ways and therefore it will not be necessary to explain or advocate any particular method. It is desirable however from one aspect of my invention to use a light value unit expressed in units of time, preferably seconds, which unit is the time required to color a standard photosensitive paper to a standard tint under any particular light intensity. It requires approximately one second to color a certain standard photosensitive paper to a standard tint at the equator on a brilliant day when the sun is at the zenith.

I have taken this unit as a standard and computed my exposure tables in terms of this unit for all parts of the civilized world for different times of year and day and for different atmospheric conditions. My tables instead of expressing the light value directly express the reciprocal of the light value in seconds. Thus, at midday on a brilliant day in June for latitude 40 deg. N. it requires two seconds to color the standard photosensitive paper to the standard tint and three seconds between the hours of 8:00 and 9:00 in the morning and 3:00 and 4:00 in the afternoon. For the sake of simplicity these values are expressed in my tables as "2" and "3" respectively. These values and likewise the values for other conditions as expressed on the tables used in my instrument are hereinafter referred to as "light factors". Thus, I use the term "light factor" as broadly designating the light value under one condition as compared to the light value under a different condition and I do not wish to be limited by the use of this expression to the particular system of units described herein.

The light factor tabular disc for 40 deg. N. latitude is illustrated in Fig. 5 and is sufficiently accurate for all latitudes between 35 deg. and 45 deg. N. and is marked accordingly. Preferably the various countries, States and provinces falling within these latitudes will also be included on the disc in the space not required for the light factor. Thus, on the inner portion 11 of the disc shown in Fig. 5, I have indicated the various countries or divisions thereof for which this particular disc may be used. On the outer portion 12 of the disc there are arranged 12 light factor tables indicated by the portions 13, one for each month of the year. The name of the month for each table is preferably indicated at the bottom thereof and the tables are arranged in consecutive order as illustrated. The day division limits for the light factors are indicated at the top of each table at 14. The significance of this arrangement will best be understood by referring now to Figs. 1 and 4 where it will be noticed that opposite the outer portion 12 of the tabular discs there is provided an opening 15 in the front cover 2 of the casing which opening occupies a sector in this instance of exactly 30 degrees and extends to the outer and inner edges of that portion 12 of the tabular discs 9 occupied by the monthly tables. It will thus be obvious that any one of the light factor tables appearing on the front of the uppermost disc 9 together with the corresponding day division limits and name of the month may be made to appear in this opening. In Figs. 1 and 4 the monthly table for June of the disc for 40 deg. N. latitude appears in the opening 15. In order to facilitate the moving and correct positioning of the upper disc 9 so as to bring any desired monthly table exactly opposite opening 15, I have provided each disc with small holes 16 near the outer circumference opposite the names of the months and a corresponding opening 16' in the upper edge of opening 15 so that when any one of the monthly tables of the upper disc 9 is correctly adjusted with respect to opening 15, one of the holes 16 will coincide with opening 16'. Now all that is necessary to do to advance the disc one month is to insert a pencil point, pin or similar object into the coinciding openings 16' and 16 and move the upper disc downward until the pencil or other object abuts against the lower edge of opening 15. This advances the upper disc exactly 30 degrees and brings the next following monthly table into correct alinement with opening 15 and the next hole 16 into alinement with opening 16'. I have found that the ordinary metal stylus used with autograph cameras serves the purpose for moving the discs very well. The total thickness of the various discs 9 and the spacer ring 10 should be just sufficient to allow the upper disc to be moved in this manner with slight friction.

On the outer circumference of cover 2 opposite opening 15 there is provided a sector plate 17. This plate is secured to the cover 2 in any suitable manner and is preferably set into the cover so that their outer surfaces are flush with each other. If desired, this plate may be stamped integral with cover section 2. The plate 17 is divided by radial lines into seven sections which correspond to the seven radial sections on each monthly table of the discs 9. The seven sections of plate 17 reading from top to bottom are lettered as follows: "Day division limits" "Brilliant" "Bright" "Diffused" "Dull" "Very dull" and "Month". The five intermediate sections refer to the light on the subject being photographed as indicated in the margin of that portion of the plate 17. It will now be seen from an inspection of Figs. 1 or 4, that when the upper disc 9 is correctly adjusted with respect to opening 15 for any given month, sections 14, 13 and 16 of disc 9 will appear opposite the sections of sector plate 17 marked "Day division limits", "Subject lighting" and "Month" respectively. The portions 13 and 14 of the monthly tables on discs 9 are divided into three groups by circumferential lines for the purpose of indicating the proper day division limits to be used in selecting a light factor. Opposite opening 15 on cover 2 the names of the day divisions are indicated at 18 and are in alinement with the day division limit values on disc 9 to which they refer. Thus, referring to Fig. 4, it will be seen that between the hours of 8:00 and 9:00 in the morning and 3:00 and 4:00 in the afternoon for latitude 40 deg. N. in the month of June, the light factors contained in the outer column should be used; at midday which for this table is from 9:00 a. m. to 3:00 p. m., the middle column of light factors should be used; and for early morning between the hours of 7:00 and 8:00 and for evening, between the hours of 4:00 and 5:00, the inner column of light factors should be used. In order to facilitate the reading of the instrument, I prefer to arrange the day division limit figures the same side up as the corresponding lettering on the portion 18 of the cover and at an angle of 90 degrees from the upright position of the light factor values and the corresponding lettering on plate 17. It will be seen from an inspection of Fig. 5 that the day division limits and light factors are not the same for all months but vary in accordance with actual conditions which have been predetermined in any desired manner. Certain of the light factor spaces for the months of December, January and February are filled in with a dash indicating that there is insufficient light to take a photograph under these conditions. The proper light factor to be used for any given time and place will also depend on the nature of the light falling on the subject to be photographed. If the sun is shining on the subject unobscured by cloud, mist or shade, the light factor would be selected from the radial row marked "Brilliant"; if the sun is covered by light clouds or a slight mist or smoke, but the sun still throws strong shadows on the subject, the light factor would be selected from the radial row marked "Bright". If there is a general even light on the subject such as where cast shadows are just distinguishable, but no direct sunlight, the row marked "Diffused" should be used. When the sky is covered with dull clouds or the subject is fairly well shaded and no cast shadows are distinguishable, the row marked "Dull" should be used, and when the sky is overcast with heavy gloomy clouds, the subject being in the open or where the sun is bright, but the subject is heavily shaded as in a thick woods, the row marked "Very dull" should be used. It will be of considerable assistance in determining the lighting of the subject to look at the same through the view-finder.

Of course, it would be possible to use any degree of refinement in selecting the divisions for the latitude, year, day and subject lighting, but I have found that the divisions above specified give sufficiently accurate results when used in connection with my improved calculator, in a manner presently to be explained, without making the instrument unduly complicated and burdensome to use. By using the divisions indicated above, light factor tables suitable for use with my instrument for all inhabitable countries of the world may be combined into eight disc shaped tables calculated for the following latitudes, the fractional form given after each latitude indicating that the table is suitable for use over that range,—

$40°N.\frac{45}{35}, 60°N.\frac{70}{58}, 55°N.\frac{58}{53}, 52°N.\frac{53}{45}, 40°N.\frac{45}{35}, 30°N.\frac{35}{25}$, Tropics $\frac{25N}{25S}, 30°S\frac{25}{35}, 40°S\frac{35}{50}$.

Each of the four discs 9 shown in Fig. 5 has one such table on either side so that only the four discs are required for a worldwide instrument. If desired, a disc might be provided for each latitude division in which case the names of the various countries for the given latitude might be contained on the opposite side of the disc from the table leaving more room for the light factors which could then be spread over a greater radial depth of the disc and the opening 15 enlarged accordingly. Preferably, the discs 9 are made very thin so as to be slightly flexible. They may be made from any suitable material such as celluloid or thin sheet brass or other metal. The tables may be etched, engraved, printed or carved on or in the disc in any suitable manner. The spacer ring 10 will be just thick enough to produce a snug fit and still permit the upper ring to be easily moved. Ring 10 will preferably have a larger inner diameter than the discs 9 so as to allow plenty of room for the inner flange 8' of ring 7. It will seldom be necessary for the ordinary photographer, unless he travels, to change the discs for latitude, but if it is desired to do so, the case may be opened by placing an instrument such as the point of a knife in the opening 19 shown in Fig. 13 to pry it open as illustrated in this figure. Then the proper disc and table will be placed uppermost and the casing closed. The disc must also be advanced once a month as previously described.

I will now explain the apparatus for and manner of using the light factors in determining camera exposure adjustments. On the front of cover 2 there is arranged a scale designated in general by the numeral 20, which in Fig. 1 is graduated from 64 to 1/100 seconds in a sufficient number of steps to accurately take care of all light conditions and exposures liable to be met with in ordinary photography. It will be noted that below 1/10 this scale is not marked in the fractional form, but is marked "25", "50" and "100" indicating 1/25, 1/50 and 1/100 seconds respectively and is thus marked so as to correspond with the form of exposure time markings commonly found on cameras. Each graduation of this scale is also marked "T", "B" or "Snap" corresponding to the usual camera exposure time markings, indicating respectively "Time exposure," "Bulb exposure" and "Snap shot." The significance of these markings will be clear when the complete operation of the instrument is hereinafter described. In practice it will be found that the part of scale 20 from 1 to 64 will be the only portion used for light factors as the lowest light factor unit which I use is 1. The entire scale 20 will be used for exposures. The respective ends of the scales may be marked accordingly in a manner suggested in Fig. 11. Cooperating with scale 20 is a subject scale 21 and a stop scale 22 respectively mounted on an overhanging sector 23 of flange 8 and a ring 24. These parts are held together and to the front cover 2 by means of the marginal flanges 8 and 8' on ring 7 as clearly shown in Figs. 2 and 3. The rings which carry the subject and stop scales are rotatably adjustable with respect to the scale 20 contained on the front cover 2 and in Fig. 1 the stop and subject scale rings are adjustable with respect to each other for the purpose of making the instrument adjustable for different plate speeds. The ring 24 as it appears when removed from the instrument is shown in Fig. 6 where it will be seen that a plate speed scale 25 is contained on its inner edge. This plate speed scale is covered up by the marginal flange 8 of ring 7 when the parts are assembled as in Fig. 1, except at an opening 26 therein. The plate speed and stop scales are so related with respect to this opening that when the plate speed being used appears in opening 26, the instrument is correctly adjusted for this particular plate speed. Thus, in Fig. 1, the instrument is adjusted for a plate speed of 512. In order to make the ring 24 adjustable with respect to ring 7 and still permit them to be moved together with respect to scale 20 as a single dial, means are provided to normally hold rings 7 and 24 in fixed relation. To this end ring 24 is provided with a plurality of spaced notches 27 in its outer edge which cooperate with a finger 28 formed by a turned down portion of one end of sector 23. A handle 29 is formed by a turned up portion of the same end adjacent finger 28. This is best illustrated in Fig. 1ª, which shows an end view of sector 23. The finger 28 fits into the notches 27 and normally prevents the relative movement of the two rings. When it is desired to adjust for a different plate speed, the end of sector 23 together with finger 28 is sprung away from ring 24 a sufficient distance for the finger to clear the notches 27 at which time the two rings may be adjusted relative to each other until the desired plate speed appears in opening 26 at which time the upward pressure on sector 23 is released and finger 28 is allowed to move into a different notch 27, the notches being correctly positioned for this purpose. Handle 29 is provided to facilitate the adjustment of scale 21 with respect to scale 20. It will be understood that the various scales have been carefully compiled and are so associated with each other in the improved calculator as to give accurate results when correlated in the manner now to be explained.

The operation of the instrument is best illustrated by means of an example. Let us suppose the photographer wishes to take some pictures in Washington, D. C. in the month of June. Since Washington, D. C. lies within the latitudes of 45 and 35 deg. N. the disc table for 40 deg. N. latitude will be placed uppermost in the instrument and will be adjusted until June appears opposite "month" on sector 17. Let us suppose the camera is loaded with a film having a plate speed of 512. He therefore, adjusts the ring 24 relative to ring 7 until 512 appears in opening 26. At 8:15 a. m. on a bright day he desires to photograph a normal subject in the open. From the exposure table he notes that he should use the factor "4". He then sets "Normal" on the subject scale opposite "4" on scale 20. The correct exposures for each camera stop is then indicated opposite stop scale 22. The adjustments above referred to are indicated in Fig. 1 where it will be noted that if a snap shot is desired either stop 4 or 8 may be used, giving the exposure 1/25 of a second which is indicated as at 25 in order to correspond to the usual camera markings. A bulb exposure may also be made using any one of the combinations indicated thus:—stop 16 and 1/8 of a second exposure, stop 32 and 1/4 of a second exposure or stop 64 and 1/2 of a second exposure. The camera stop and exposure pointers are then set to the selected combination and the picture taken. Further examples will be given in connection with other modifications.

The calculator as thus far described may be carried in the pocket if desired. It is generally preferable however to mount the instrument in fixed relation to the camera in a position to be easily inspected when setting the camera stop and shutter timer pointers and to this end the instrument is made in the annular form illustrated, of the proper size to fit about the lens tube of a camera in a manner illustrated in Fig. 12 and secured thereto in any suitable manner. The usual stop and shutter timer scale plates of a camera indicated at 30 and 31 respectively in the various figures are usually fastened to the camera by screws 32 indicated in dotted lines in Fig. 12. I have found it convenient to fasten my instrument to the camera by providing screw holes 33 (see Fig. 4) in the back portion 1 of the casing, positioned to come in alinement with the usual screw holes used in fastening the plates 30 and 31 to the camera and passing the screws 32, or if necessary, screws slightly longer, through the back section 1 of my instrument casing clamping the plates 30 and 31 between it and the camera. The plates 30 and 31 may also be secured to the back 1 of the casing by hollow rivets or screws positioned in alinement with the usual screw holes in the camera. The calculator might also be secured about the the lens tube by means of a rubber gasket compressed between the outer surface of the lens tube and the inner surface of the calculator casing. I do not wish to be limited to any particular method of fastening the instrument to a camera. If desired the camera wall of the instrument casing may be extended as indicated in dotted lines in Fig. 3 to form a seat for the usual cap or the color screen.

There are two different systems of plate speed and stop markings in common use. The system more often used with rectilinear lenses is called the "uniform system" and is designated thus:—U. S. Another system commonly used with astigmatic lenses is called the "focal system" and is designated by the letter "F". The scales of the calculator shown in Figs. 1 and 10 are designed for the uniform system and the calculator shown in Fig. 11 is designed for the focal system. In view of the two different systems of markings above referred to it becomes important to provide a calculator which may be readily adapted for either system. Figs. 6, 7, 8 and 9 illustrate a convenient way of accomplishing this object with one form of my calculator without increasing the number of necessary parts. Figs. 6 and 7 represent opposite sides of the ring 24 and the stop scale plate 30. The ring 24 and plate 30 have their opposite sides provided with scales designed for the two systems, Fig. 6 illustrating the uniform scale system and Fig. 7 the focal scale system. It will now be evident that a calculator provided with such parts may be adapted for either the uniform or focal system by merely reversing these parts. Thus, the calculator shown in Fig. 1 could be changed to a focal system calculator by merely reversing ring 24 and plate 30, provided the reversed sides of these parts are marked with the scales illustrated in Figs. 6 and 7. In order that the ring 24 may be reversed in a convenient manner the ring 7 may be split in a manner illustrated by the ring 7' of Fig. 8. Here I have illustrated the ring 7' as being split at 34 in a manner to permit the end 34' to be sprung inward, as indicated in dotted lines, a sufficient distance to release ring 24 which may be then removed, turned over and inserted again. This must be done when the cover is removed as in Fig. 13 because the inner wall 6 of the back section would otherwise prevent the end 34' from being sprung inward, as will be clear from an inspection of Figs. 2 or 3 showing the parts assembled.

In Fig. 10 I have illustrated my improved calculator with portions of the outer scale 20' being utilized to serve as the setting scales for the stop and shutter timer pointers respectively of a camera. The shutter timer scale shown on this calculator is designed to be used in connection with the more expensive high speed cameras. Thus, the snap shot or instantaneous exposure scale shown at the top of the meter is graduated in small steps from one second down to 1/300 of a second. Except for the rearrangement in scale 20', the purpose of which will be explained later, the instrument is otherwise similar to the calculator shown in Fig. 1. The shutter timer and stop scale plates however are omitted because, as previously mentioned, portions of the outer scale 20' of the calculator take their places. Assuming the instrument to be mounted about the lens tube of a camera in the manner previously described, the stop pointer of the camera designated at 35, which will be connected to the mechanism for adjusting the iris diaphragm, and the shutter timer pointer designated at 36, which will be connected to the shutter timer adjusting mechanism, are respectively mounted adjacent the lower and upper portions of scale 20'. I have not thought it necessary to illustrate the connections between the pointers 35 and 36 and their respective mechanisms on the camera as it will be evident to those familiar with cameras that the proper motion transmitting cams may be provided to make the adjustments of the camera correspond to the scale indications on the calculator.

Let us assume that the photographer in Washington, D. C. in June desires to photograph a distant view at 4:00 p. m. with this type of calculator. His camera is loaded with a film having a plate speed of 768. The plate speed scale is therefore adjusted until 768 appears in opening 26. This adjustment is one notch to the right from the adjustment shown in Fig. 1 and this adjustment moves the stop scale a corresponding amount. He finds the sun to be covered with dull clouds and no cast shadows are distinguishable. Referring to the light factor table he notes that at 4:00 p. m. with a dull light on the subject he should use factor 12. He therefore moves the subject scale until "Distant view" coincides with "12" on scale 20'. Stop pointer 35 is then set opposite the number on the lower part of scale 20' which corresponds to the number of the stop it is desired to use, for example, stop 16 and shutter timer pointer 36 is moved opposite this number on stop scale 22, which sets pointer 36 for an instantaneous exposure of 1/10 of a second. These adjustments are illustrated in Fig. 10 and the camera is properly adjusted to snap for these conditions. The same adjustments might be used to photograph a normal subject where the light factor is 4. Likewise, these calculator adjustments might be used to take a snap shot of a dark object near the camera with a light factor of 2 using stop 4 in which case pointer 35 would be moved opposite 4 and pointer 36 would be moved opposite 1/50.

When the light is poor or the plate speed of the film or plate being used is of a comparatively low value, it will sometimes be desirable to use a time or bulb exposure, particularly if the subject being photographed is of such a nature as to require a comparatively large amount of light. For example, let us assume the following conditions: Plate speed "768", light factor "24" and subject "Dark object near". In this case the subject and light factor scales should be adjusted to make "dark object near" appear opposite "24". This adjustment will bring stop numbers 32 and 64 on scale 22 opposite light factor numbers 2 and 4 respectively on scale 20' indicating that if either one of these stops are used, the exposure should be a "time" or "bulb" exposure. Thus, for example, shutter timer pointer 36 will be set opposite "T" on the upper right of scale 20' and stop pointer 35 will be set opposite "32" on the lower right of scale 20' and the exposure given two seconds. In order to assist the photographer in determining whether he should use an instantaneous exposure or a time exposure under any given conditions, I have divided the scale into two parts, one marked "instantaneous exposures" and the other marked "time and bulb exposures", the latter marking being covered up in Fig. 10 by the subject scale 21 the ends of the reference arrows therefor being shown at either end of the subject scale, indicating the limits.

In Fig. 11 I have illustrated a modification of my improved calculator which will be referred to as the shrouded type. The back section 1 of the casing, the light factor discs 9 and spacer discs 10 are exactly similar to those previously described. The front cover plate 2 is also substantially similar to the cover plate shown in Fig. 2, it being provided with an opening 15 indicated by dotted lines, a subject lighting sector 17 and a scale 20, all as shown in Fig. 1. The names of the day divisions indicated at 18', the subject scale 21, and the stop scale 22 are contained on a front plate 37 which is adjustable with respect to the cover 2 and is secured thereto by having its inner edge turned over and under the inner edge of cover 2 as indicated at 38. The outer edge of plate 37 is turned over slightly as indicated at 39 for the purpose of slightly spacing it from cover 2. The extreme outer edge of plate 37 is preferably provided with a milled surface in order that the same may be gripped and easily adjusted with respect to the cover 2. A handle might also be provided as at 29 in Figs. 1 and 10, if desired. The calculator of Fig. 11 is not adjustable for different plate speeds; that is to say, it is a fixed plate speed calculator which in this instance is for 111 using the focal system. The plate speed scale 22 may therefore be mounted directly on the plate 37 which carries the subject scale 21 and a separate ring for that purpose, such as shown in Fig. 7, is unnecessary. The calculators of Figs. 1 and 10 might also be designed for a fixed plate speed, if desired, in which case the ring 24 would be omitted and the stop scale would be carried directly on flange 8 extended. Adjacent the names of the day divisions on plate 37 of Fig. 11 a radial opening 15' is provided coinciding as to length with the width of opening 15 in cover 2. The width of opening 15' is just sufficient to read the day division limit values on the upper tabular disc 9 when plate 37 is moved so as to bring opening 15' over said values. Preferably a pointer 40 is provided integral with plate 37 extending from opening 15' slightly over the indications on sector 17 so that when any one of the monthly tables on disc 9 is correctly adjusted with respect to opening 15 and plate 37 is moved to bring pointer 40 over an indication on sector 17, the values on disc 9, corresponding with such indication, will appear in opening 15'. An opening 41 is provided in plate 37 adjacent the subject scale 21 in order that the light factor values on scale 20 adjacent the subject scale may be seen. Likewise, openings 42 are provided in plate 37 opposite each stop number in order that the exposure instructions on scale 20 appearing opposite said stop numbers may be read. The various openings may be marked on plate 37 as illustrated to indicate the nature of the values which should appear therein. Likewise, the stop scale is labeled thus: "F. stops". Preferably the plate speed for which the instrument is designed is also stamped thereon. The exposure timer scale plate 31 and the stop scale plate 30 will be similar to those previously described, the stop plate being marked for the focal system. In the shrouded type of calculator shown in Fig. 11 all portions of the disk 9 and scale 20 not susceptible of use for a given adjustment are covered up by plate 37 whereby confusion in reading and setting the instrument is prevented and the liability to make mistakes with this type of calculator is reduced to a minimum. The operation of this calculator is in general similar to those previously described. To adjust the disc 9 for the proper month, pointer 40 is first turned opposite "Month" to see what month the instrument is set for. Supposing it is found that the disk 9 should be advanced one month, opening 15' will be moved up until a pencil point may be inserted therethrough into the opening 16' of cover 20 and an opening 16 in disk 9 (see Fig. 4). Then the opening 15' together with the pencil and the upper disc 9 will be moved downward until the pencil abuts against the lower edge of opening 15. This advances the disc 9 and correctly positions it for the next monthly table. To find a light factor the pointer 40 will next be turned to "Day division limits" to see which of the three rows of light factors should be used for the particular time of day and pointer 40 will then be turned to the proper value of subject lighting and the light factor noted. Then the plate 37 will be turned until the proper subject is opposite the selected light factor and all of the proper combinations of stop and exposure instructions will appear opposite the stop scale. These adjustments may all be made without removing the hand from the calculator as only small circular movements of plate 37 will be necessary. Pointers 35 and 36 will then be moved to the selected combination of stop and exposure time and the picture taken.

All parts of my improved calculator are so designed that they may be stamped from sheet metal and assembled in a very simple manner. This assures a low cost, for after the stamping dies are made the calculator parts may be quickly turned out in large quantities. The parts being made of metal, there is nothing to wear out or become soiled as would be the case with the usual book form exposure calculators. By providing circular tables arranged as a two-dimensional chart which may be moved past an opening provided with the two-dimensional chart indications at its margin, I am enabled to provide light factors for all parts of the world, times of day and year and subject lighting conditions in a very compact and convenient manner. After the proper light factor has been found only one simple adjustment of the same instrument is necessary to obtain all of the correct combinations of camera adjustments possible to use for a given set of conditions. These indications are given in terms of the camera markings so that no calculations or interpolations are necessary. Furthermore, the instrument may be used for any plate speed or for either of the commonly used camera marking systems. Finally, the instrument may be mounted in fixed relation to a camera so as to be operated with one hand and in the most convenient position to be seen when preparing to take a photograph. The instructions for using are simple and almost self-evident from an inspection of the calculator and the amature photographer may be assured that if he has properly followed these instructions in taking a picture, the exposure is sufficiently accurate to obtain a good photograph without resorting to the usual practice of taking several exposures with the hope of getting one good one.

In my United States Patent 1,575,338, entitled "Photographic exposure meter" I have described and claimed an instrument for measuring light values by means of a photo-sensitive paper together with scales arranged in the same units and in much the same manner as in the calculator of my present application. In the meter of my prior patent a disc of photosensitive paper was contained within the instrument casing in a manner very similar to the manner in which the light factor disc tables of the present calculator are arranged and means were provided for moving said disc of photosensitive paper past an opening in the meter cover surrounded with a standard tinted field for the purpose of exposing a portion of said paper to the light and noting the time required to color the same to the shade of the standard tint for the purpose of measuring the prevailing light value. The calculator of my present invention is designed so that it may be converted into such an exposure meter by substituting for the light factor tables means for supporting and moving a disc of photosensitive paper and providing a plate having a small opening flanked by a tinted field for substantially closing the opening 15 in cover 2. These extra parts are illustrated in reduced size in Figs. 14 to 17 inclusive. Fig. 14 illustrates a split spring hub 43 of the correct diameter to fit within the instrument casing with the inner diameter of the hub riding on the inner surface of the wall 6 of the back section 1 of the casing. This hub is provided with a bent over finger 44 which is adapted to fit into a corresponding hole in the back wall 1 of the instrument casing so that the finger piece 45 will extend through the opening 19 provided in the outer wall of casing 1 (see Fig. 13). The extensions 46 and 47 of hub 43 will come just inside of casing 1 and will extend a small distance on either side of opening 19. Fig. 15 illustrates a wheel 48 of the correct dimensions to fit within the instrument casing, it having the same inner and outer diameters as discs 9. This wheel has a plurality of radial teeth 49 cut in its outer surface and a plurality of rearwardly bent spring sectors 50 cut in its inner surface. This wheel is designed to support a disc of sensitive paper 51 shown in Fig. 16 on its upper surface and in order to provide a driving connection between the paper and the wheel one tooth 49' is made long enough so that the paper disc 51 may be passed beneath this tooth and over the remaining teeth. The extension 47 of hub 43 is bent forward so as to form a pawl for engaging the teeth 49 when the wheel is placed on hub 43 in assembling the parts. A finger 52 formed by the slit adjacent opening 19 in the outer wall of casing 1 is bent inward to form a ratchet for engaging teeth 49. When these parts are assembled, paper disc 51 will be uppermost and hub 43 lowermost. Finger 44 will extend into the opening provided for it in the back wall of casing 1 and finger piece 45 through opening 19. When the cover 2 is in place springs 50 will be under slight compression so as to hold the paper disc snugly against the inner wall of cover 2 and hub 43 against the back wall 1. Then, by pressing downward on finger piece 45 the wheel 48 and disc 51 will be advanced the distance of one tooth. By releasing finger piece 45 it will come back to its original position due to its own resiliency and ratchet 22 will prevent the wheel 48 from being retracted with it. The width of opening 19 is such as to limit the movement of finger piece 45 as indicated above. The parts thus described form a simple means of advancing the disc of sensitive paper by a step-by-step movement in a clockwise direction. The plate 53 shown in Fig. 17 is adapted to fit over opening 15 in cover 2, it having a stepped under surface as indicated in dotted lines so as to permit its central portion to set down in opening 15 with the outer edges extending a small distance over cover 2 and thus prevent any light getting to the sensitive paper 51 except through the small opening 54. The plate 53 may be secured in place in any convenient manner.

When the instrument is used as a meter the subject lighting sector 17 may be removed. It will necessary to assemble the meter parts in a dark room in order to protect the sensitive paper. It was previously stated that the light factor units of the calculator were based on the time to color a standard photosensitive paper to a standard tint, which time was one second at the equator at noon on a brilliant day. The paper and tint to be used in the meter will conform to these standards so that the length of time, in seconds, required to color the photosensitive paper 51 to the standard tint 55 will be substantially the same as the light factor values given by the tables under similar conditions of time, latitude and subject lighting. Of course the value obtained by the meter will generally be slightly more accurate than that given by the tables but if the number of seconds obtained by the meter is noted and the nearest value thereto on the scale 20 is used as the light factor, the resulting error may be disregarded as it will never be sufficient to spoil the picture. When the instrument is assembled as a meter its use may be explained as follows: An unexposed portion of the sensitive paper will be advanced into the opening 54 and there exposed to the general light falling on the subject to be photographed. The time for the sensitive paper to color to the standard tint 55 will be noted. Let us assume, for example, that the time to color is 13 seconds. The nearest light factor unit on the instrument is 12 and consequently the nature of the subject being photographed as indicated by the subject scale will be set opposite 12 and the correct combinations of shutter timer and stop adjustments will be obtained as previously described. Conditions might arise where the time to color obtained is halfway between two of the light factor values on scale 20 in which case either of those values may be used in determining the proper camera adjustments. Let us assume, for example, a time to color of 40 seconds, subject "Clouds", plate speed "768", and the selected stop as "16". Referring to the instrument of Fig. 10, which has an instantaneous exposure scale more finely graduated than is ordinarily used, we see that if light factor 48 is used, the shutter timer pointer 36 should be set at 1/10 while if light factor "32" is used, the pointer should be set opposite 1/15, the next smaller exposure adjustment given. It will be evident to photographers that a variation of this extent is permissible without noticeably affecting the correctness of the exposure. The same considerations arise when using the disc tables of the calculator. For example, at 3:00 p. m. in June with a brilliant subject lighting we could use either light factor 2 or 3 or if at 12 o'clock, it was undecided weather, the subject lighting was Brilliant or Bright, either factor 2 or 3 could be used. From the above considerations it will be evident that a greater degree of refinement in the graduations of the light factor tables as to the longitude, day division limits or subject lighting indications would only complicate the instrument without it being possible to obtain more accurate exposures because the exposure instructions obtained by the present tables are as accurate as can be used with the present refinement in camera exposure adjustments.

It will be evident that by increasing the outer diameter of the instrument casing, both the disc tables and the photosensitive paper light measuring means could be combined in the same instrument, one outside the other. Such a combination would constitute a universal photographic exposure calculator both for exterior and interior photography with the advantages of both the tables and light measuring means.

The light factor tables of my improved calculator have been computed for sea level and are correct for this altitude. If the instrument is to be used considerably above sea level, the next lower light factor should be used for each 5000 feet elevation. It will rarely be necessary to make this correction.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

1. An instrument for use in photography comprising an annular casing, an annular disc in said casing provided with light factor tables, an opening in said casing of the same size as the tables on said disc, a scale plate flanking said opening and means for positioning any one of said tables opposite said opening in alinement with said scale plate.

2. An instrument for use in photography comprising an annular casing, an annular disc in said casing provided with a plurality of equal sized light factor tables, each arranged as a two-dimensional chart, an opening in said casing the same size as one of said tables, the two dimensional chart indications for said light factor tables flanking said opening on two sides and means for positioning any one of said tables in said opening with the proper light factor values in alinement with their corresponding marginal indications.

3. In combination with a camera, an exposure calculator provided with light factor tables, said tables being graduated in the same units as the light factor scale of the calculator and the camera exposure instruction scales of said calculator being graduated in terms of the corresponding scales on the camera whereby all interpolations are avoided.

4. An exposure calculator casing provided with an opening, a subject lighting scale adjacent one edge of said opening and a day division limit scale adjacent another edge of said opening, and a plurality of light factor tables within said casing the same size as said opening, said tables being so arranged that any desired table may be brought into said opening and correlated with said scales.

In witness whereof I have hereunto set my hand this 31st day of May, 1922

JOHN R. HEWETT.